United States Patent [19]

Poore

[11] Patent Number: 4,681,073
[45] Date of Patent: Jul. 21, 1987

[54] FUEL INJECTION CONTROL VALVE
[75] Inventor: Bernard B. Poore, Moline, Ill.
[73] Assignee: Deere & Company, Moline, Ill.
[21] Appl. No.: 826,458
[22] Filed: Feb. 5, 1986
[51] Int. Cl.[4] .................. F02B 53/10; F02M 45/02
[52] U.S. Cl. .................................. 123/206; 123/300
[58] Field of Search ................... 123/205, 206, 300
[56] References Cited
U.S. PATENT DOCUMENTS 3,894,518  7/1975  Gavrun et al. .
3,960,115  6/1976  Lamping et al. .
4,083,329  4/1978  Myers .
4,399,793  8/1983  Poore et al. .
4,520,774  6/1985  Sitter ................................. 123/300
4,590,904  5/1986  Wannenwetsch .................. 123/300

Primary Examiner—Douglas Hart

[57] ABSTRACT

A stratified charge rotary combustion includes separate pilot and main fuel injector nozzles, a fuel tank and an engine driven injector pump. A fuel supply valve includes a shuttle member which moves in response to pressure from the pump to transfer a pilot quantity of fuel to the pilot nozzle and then to communicate fuel from the pump to the main nozzle.

2 Claims, 1 Drawing Figure

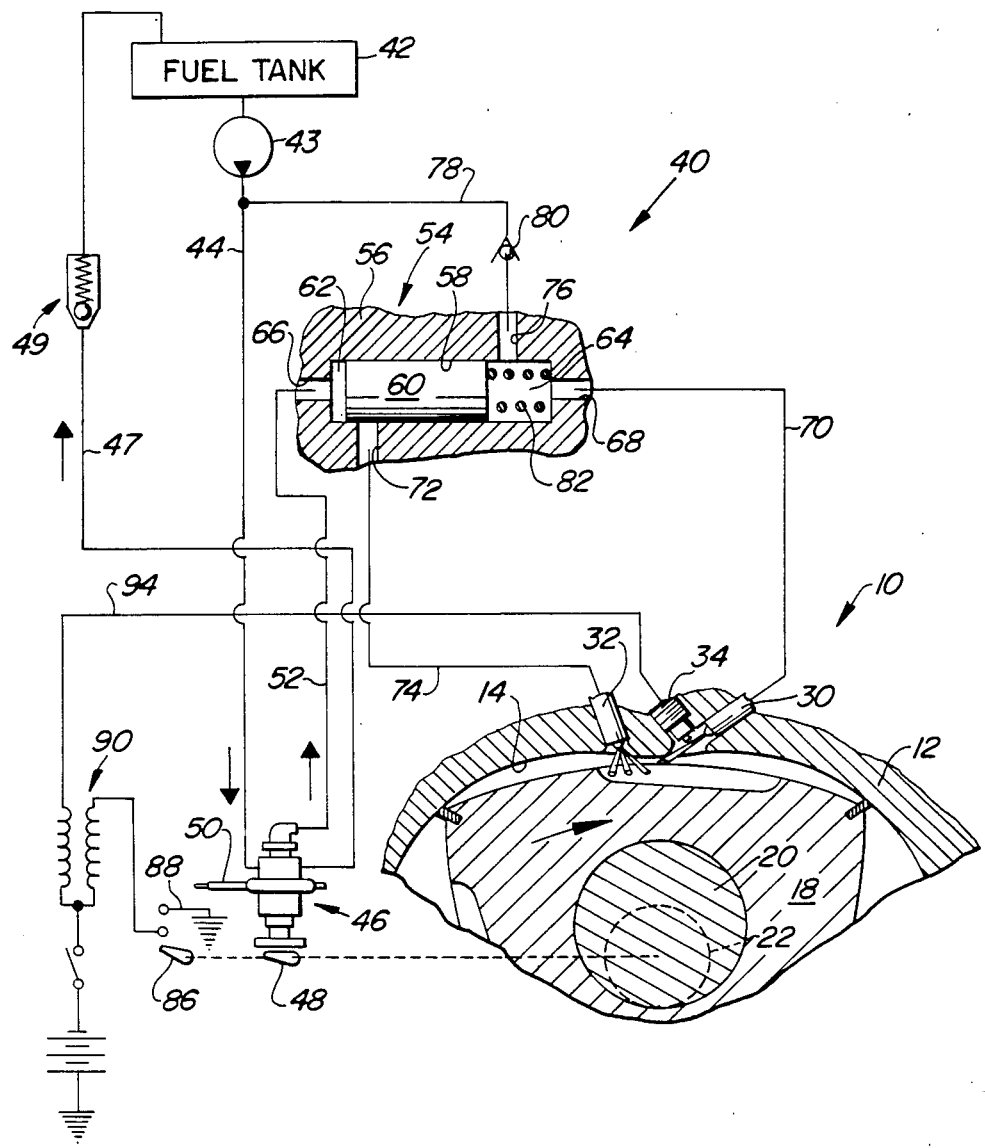

FUEL INJECTION CONTROL VALVE

BACKGROUND OF THE INVENTION

This invention relates to a fuel injection system and more specifically, to a control valve for a fuel injection system having both pilot and main fuel injectors.

A stratified charge rotary internal combustion engine includes separate pilot and main fuel injectors associated with each rotor. As shown in U.S. Pat. Nos. 3,894,518, 3,980,115, and 4,083,329, such engines typically include a separate injector pump corresponding to each fuel injector. This increases the cost, complexity and weight of such engines. It would be desirable to serve both the pilot and main fuel injectors from only a single pump.

SUMMARY OF THE INVENTION

It is an object of the present invention to serve, from a single pump, both the pilot and main fuel injectors in a stratified charge rotary combustion engine.

This and other objects are achieved by the present invention which includes a fuel tank, a cam-operated fuel pump and a shuttle valve fluidly connected between the tank, the pump and the pilot and main fuel injectors. The shuttle valve includes a housing with a valve bore which slidably receives a shuttle which divides the bore into a pilot chamber and a main chamber. Fuel flow from the pump to the main chamber moves the shuttle to force a quantity of fuel from the pilot chamber to the pilot nozzle. Further movement of the shuttle opens communication between the pump and the main nozzle via the main chamber.

BRIEF DESCRIPTION OF THE DRAWING

The FIGURE is a schematic diagram of the fuel supply system of a stratified charge rotary engine including the present invention.

DETAILED DESCRIPTION

A rotary internal combustion engine 10 includes a housing 12 forming an engine cavity 14 therein. A rotor 18 is journaled for rotation within cavity 14 on an eccentric portion 20 of a shaft 22 which extends coaxially through the housing 12 and is supported by bearings (not shown).

The engine 10 also includes suitable gearing (not shown) between rotor 18 and the housing to control relative rotation of the rotor 18, such gearing being conventional and preferably is similar to that shown in U.S. Pat. No. 2,988,065, granted June 13, 1961 to Wankel et al.

The engine 10 includes a pilot fuel injector nozzle 30, a main fuel injector nozzle 32 and an ignitor or spark plug 34, preferably arranged similar to that shown in U.S. Pat. No. 4,083,329 issued Apr. 11, 1978 to Myers. In a known manner, the burning fuel from nozzle 30 acts as a pilot flame to ignite fuel from nozzle 32.

A fuel supply system 40 for nozzles 30 and 32 includes a fuel tank 42. A fuel supply pump 43 pumps fuel from tank 42 into lines 44 and 78. Conduit 44 communicates fuel from tank 42 to a conventional fuel pump 46 which is engine driven via cam 48 and which is preferably similar to that shown in U.S. Pat. No. 3,894,518, issued July 15, 1975 to Gavrun et al. The pump 46 includes a linearly movable rack 50 for varying the effective stroke of pump 46 to regulate the amount of fuel delivered by conduit 52 to fuel supply valve 54. A return line 47 communicates fuel from pump 46 back to tank 42 via regulating valve 49 or an orifice (not shown).

Valve 54 includes a housing 56 which defines a valve bore 58 therein. A shuttle member 60 is slidably and sealingly movable in bore 58 and cooperates with the wall of bore 58 to define a first or main chamber 62 and a second or pilot chamber 64 therein. At one end of bore 58, the housing 56 includes an axial port 66 which communicates pump 46 and conduit 52 to chamber 62. At the opposite end of bore 58, the housing 56 includes an axial port 68 which communicated chamber 64 with pilot nozzle 30 via conduit 70. Near the one end of bore 58, radial port 72 communicated bore 58 with the main nozzle 32 via conduit 74. The port 72 is spaced axially apart from the end wall of housing 56 which is exposed to fluid pressure in chamber 62. Near the other end of bore 58, a radial port 76 communicates with the bore 58. The fuel tank 42 is communicated to port 76 via pump 42, conduit 78 and check valve 80. A spring 82 urges shuttle member 60 towards the left, viewing the figure.

An additional engine driven cam 86 is provided to operate the make-and-break contacts 88 of the ignition circuit 90 connected to spark plug 34 by conductor 94.

MODE OF OPERATION

Before a fuel injection event occurs, spring 82 maintains spoot 60 against the end wall of bore 58 adjacent port 66. Then, when fuel pump 46 pressurizes line 52, fuel flows into chamber 62 via port 66, thus moving spool 60 to the right viewing the FIGURE. This movement of spool 60 compresses spring 82 and forces a pilot quantity of fuel from chamber 64 to pilot nozzle 30 via port 68 and line 70. Eventually, spool 60 will move far enough to open port 72 to chamber 62 so that fuel from pump 46 can flow to main nozzle 32 via line 52, port 66, chamber 62, port 72 and line 74. This movement of spool 60 continues until the pressure in chamber 62 is balanced by the force of spring 82. Eventually, the pressure from pump 46 is reduced and spring 82 moves spool 60 back into engagement with the end wall of bore 58 where it remains until the next fuel injection event.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

What is claimed is:

1. In a rotary combustion engine having first and second fuel injection nozzles, a fuel supply system comprising:
   a fuel tank;
   a supply pump with an inlet communicating with the fuel tank;
   an engine driven fuel injector pump; and
   a fuel supply valve comprising:
      a housing defining a valve bore therein, a first inlet communicating the valve bore with the injector pump, a second inlet communicating the valve bore with the supply pump, a first outlet communicating the valve bore with the first nozzle and a second outlet communicating the valve bore with the second nozzle; and a valve member movable in the valve bore and cooperating with a wall of the bore to define a first chamber communicated with the first outlet and a second chamber communicated with the second outlet, the valve member being movable in response to fluid pressure in the first chamber from a first position wherein communication between the first inlet and first outlet is closed to a second position wherein communication between the first inlet and first outlet is open, the valve member forcing fuel from the second chamber to the second nozzle via the second outlet as it moves from its first to its second position, the first inlet and the second outlet extending axially from opposite ends of the valve bore, and the first outlet and the second inlet extending radially in the valve housing; and a resilient member biased to urge the valve member to its first position.

2. The fuel supply system of claim 1, wherein:

the housing has an axially facing end wall exposed to fluid pressure in the first chamber;

the first outlet is spaced axially apart from said end wall; and the valve member has an axially facing end wall which is spaced axially apart from the first outlet and which is positioned between said end wall and the first outlet when the valve member is in said first position.

* * * * *